United States Patent
Novotny

(10) Patent No.: US 10,280,492 B2
(45) Date of Patent: May 7, 2019

(54) ALLOY FOR MUD MOTOR SHAFT APPLICATIONS WITH HIGH STRENGTH, HIGH IMPACT TOUGHNESS AND EXCELLENT FATIGUE LIFE

(71) Applicant: CRS HOLDINGS, INC., Wilmington, DE (US)

(72) Inventor: Paul M. Novotny, Mohnton, PA (US)

(73) Assignee: CRS HOLDINGS, INC., Wilmington, DE (US)

(*) Notice: Subject to any disclaimer, the term of this patent is extended or adjusted under 35 U.S.C. 154(b) by 287 days.

(21) Appl. No.: 15/278,125

(22) Filed: Sep. 28, 2016

(65) Prior Publication Data

US 2017/0088924 A1    Mar. 30, 2017

Related U.S. Application Data

(60) Provisional application No. 62/233,609, filed on Sep. 28, 2015.

(51) Int. Cl.
*C22C 38/58* (2006.01)
*C21D 9/28* (2006.01)
(Continued)

(52) U.S. Cl.
CPC .............. *C22C 38/58* (2013.01); *C21D 1/18* (2013.01); *C21D 9/28* (2013.01); *C22C 38/002* (2013.01);
(Continued)

(58) Field of Classification Search
None
See application file for complete search history.

(56) References Cited

U.S. PATENT DOCUMENTS 5,972,129 A * 10/1999 Beguinot ............... C21C 5/005
                                                        148/328
9,957,594 B2 * 5/2018 Novotny ................ C22C 38/44
(Continued)

FOREIGN PATENT DOCUMENTS

JP    H 11/131184 A  *  5/1999
JP    2006/111962 A  *  4/2006
(Continued)

OTHER PUBLICATIONS

International Search Report dated Dec. 2, 2016 for PCT/US2016/054049; 3 pages.*
(Continued)

*Primary Examiner* — Helene Klemanski
(74) *Attorney, Agent, or Firm* — Dann, Dorfman, Herrell and Skillman, P.C.

(57) ABSTRACT

A steel alloy is disclosed that provides a unique combination of strength, toughness, and fatigue life. The steel alloy has the following composition in weight percent:
  C about 0.15 to about 0.30
  Mn about 1.7 to about 2.3
  Si about 0.7 to about 1.1
  Cr about 1.85 to about 2.35
  Ni about 0.5 to about 0.9
  Mo+½W about 0.1 to about 0.3
  Cu about 0.3 to about 0.7
  V+⅝×Nb about 0.2 to about 0.5.

The balance of the alloy is iron, usual impurities, and residual amounts of other elements added during melting for deoxidizing and/or desulfurizing the alloy. A hardened and tempered steel article made from the alloy is also disclosed.

18 Claims, 3 Drawing Sheets

(51) Int. Cl.
  *C22C 38/02* (2006.01)
  *C22C 38/04* (2006.01)
  *C22C 38/08* (2006.01)
  *C22C 38/12* (2006.01)
  *C22C 38/16* (2006.01)
  *C22C 38/38* (2006.01)
  *C22C 38/42* (2006.01)
  *C22C 38/44* (2006.01)
  *C22C 38/46* (2006.01)
  *C22C 38/48* (2006.01)
  *E21B 4/02* (2006.01)
  *F16C 3/02* (2006.01)
  *C22C 38/00* (2006.01)
  *C22C 38/06* (2006.01)
  *C22C 38/50* (2006.01)
  *C21D 1/18* (2006.01)
  *C22C 38/10* (2006.01)
  *C22C 38/52* (2006.01)
  *C21D 9/00* (2006.01)
  *C21D 1/58* (2006.01)
  *C22C 38/14* (2006.01)
  *C21D 1/25* (2006.01)

(52) U.S. Cl.
  CPC .............. *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/16* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *E21B 4/02* (2013.01); *F16C 3/02* (2013.01); *C21D 1/25* (2013.01); *C21D 1/58* (2013.01); *C21D 9/00* (2013.01); *C22C 38/14* (2013.01); *F16C 2204/62* (2013.01); *F16C 2204/70* (2013.01)

(56) References Cited

U.S. PATENT DOCUMENTS

2010/0101780 A1* 4/2010 Ballew .................... C22C 38/04
                                                                  166/242.6
2014/0000765 A1* 1/2014 Nozaki .................... C22C 38/16
                                                                  148/504

FOREIGN PATENT DOCUMENTS

JP       2014/031525 A    *  2/2014
WO    WO 2009/090155 A1 *  7/2009

OTHER PUBLICATIONS

Written Opinion of the International Search Authority dated Dec. 2, 2016 for PCT/US2016/054049; 8 pages.*
English translation of JP 2006/111962, Apr. 2006; 10 pages.*
English translation of JPH 11/131184, May 1999; 17 pages.*
English translation of JP 2014/031525, Feb. 2014; 25 pages.*
English translation of WO 2009/090155, Jul. 2009; 8 pages.*
Latrobe Specialty Steel Company, Data Sheet, Lescalloy 4330+V Vac-Arc High Strength Alloy Steel, 2007, pp. 1-2.

* cited by examiner

ALLOY FOR MUD MOTOR SHAFT APPLICATIONS WITH HIGH STRENGTH, HIGH IMPACT TOUGHNESS AND EXCELLENT FATIGUE LIFE

CROSS REFERENCE TO RELATED APPLICATIONS

This application claims the benefit of U.S. Provisional Patent Application No. 62/233,609, filed Sep. 28, 2015, the entirety of which is incorporated herein by reference.

BACKGROUND OF THE INVENTION

Field of the Invention

This invention relates generally to a steel alloy that provides a unique combination of strength, toughness, and fatigue life. More particularly, the invention relates to a useful article made from the steel as well as a method of making the article.

Description of the Related Art

Directional drilling of oil wells often require the use of mud motors. A mud motor (or drilling motor) is a progressive cavity positive displacement pump (PCPD) placed in the drill string to provide additional power to the bit while drilling. The PCPD pump uses drilling fluid (commonly referred to as drilling mud, or just mud) to create eccentric motion in the power section of the motor which is transferred as concentric power to the drill bit by way of the mud motor shaft and a constant velocity joint. Because the drill bit encounters deposits of varying hardness and strength during the drilling operation, the transfer of the eccentric motion as concentric power through the shaft requires a strong shaft material that has high impact toughness as well as good rotating bending fatigue life. The current material of choice is the 4330V alloy that has been known to provide a yield strength (KS) of about 150 ksi (1,034 MPa) and a Charpy V-notch impact energy (CVN IE) of about 40 ft-lbs. (54.2 J) at room temperature.

Up until recently the 4330V shaft material has been acceptable. Now with drilling of deeper wells into different deposits, such as shale, a need has arisen for a stronger shaft material with better toughness than provided by the 4330V alloy.

SUMMARY OF THE INVENTION

The need described above is realized to a large degree by an alloy according to the present invention. In accordance with one aspect of the present invention, there is provided a high strength, high impact toughness steel alloy that has the following broad and preferred weight percent compositions.

| Element | Broad | Intermediate | Preferred |
|---|---|---|---|
| C | 0.15-0.30 | 0.18-0.27 | 0.21-0.24 |
| Mn | 1.7-2.3 | 1.8-2.2 | 1.95-2.05 |
| Si | 0.7-1.1 | 0.8-1.0 | 0.85-0.95 |
| Cr | 1.85-2.35 | 1.95-2.25 | 2.05-2.15 |
| Ni | 0.5-0.9 | 0.6-0.8 | 0.65-0.75 |
| Mo + ½W | 0.1-0.3 | 0.15-0.25 | 0.18-0.22 |
| Cu | 0.3-0.7 | 0.4-0.6 | 0.45-0.55 |
| V + 5/9 × Nb | 0.2-0.5 | 0.25-0.45 | 0.30-0.40 |
| Fe | Balance | Balance | Balance |

Included in the balance are the usual impurities found in commercial grades of steel alloys produced for similar use and small amounts of other elements retained from deoxidizing and/or desulfurizing additions during melting.

The foregoing tabulation is provided as a convenient summary and is not intended to restrict the lower and upper values of the ranges of the individual elements for use in combination with each other, or to restrict the ranges of the elements for use solely in combination with each other. Thus, one or more of the ranges can be used with one or more of the other ranges for the remaining elements. In addition, a minimum or maximum for an element of a broad or preferred composition can be used with the minimum or maximum for the same element in another preferred or intermediate composition. Here and throughout this specification the term "percent" or the symbol "%" means percent by weight or mass percent, unless otherwise specified.

The alloy according to the present invention provides a room temperature Y.S. of at least about 180 ksi in combination with a room temperature CVN IE of at least about 25 ft-lbs. The alloy is also capable of providing a room temperature CVN IE of up to about 60 ft-lbs (81.3 J) which represents an increase of 20% in Y.S. and 50% in CVN IE compared to the 4330V alloy. The alloy of this invention also provides very good fatigue life as represented by a rotating bending fatigue run-out stress of 90 ksi at 10 million cycles.

In accordance with another aspect of the present invention, there is provided a hardened and tempered steel alloy article that has a novel combination of Y.S., CVN IE, and fatigue life. In a preferred embodiment, the article comprises a transmission drive unit for a mud motor. The transmission drive unit includes a shaft and a constant velocity joint. The article is formed from an alloy having any of the broad, intermediate, or preferred weight percent compositions set forth above. The article according to this aspect of the invention is further characterized by being hardened and then tempered at a temperature of about 400° F. to 600° F. Alternatively, the article can be austempered to provide other combinations of Y.S. and CVN IE for applications that do not require a yield strength of at least 180 ksi.

In accordance with a further aspect of the present invention there is provided a method of making a transmission drive unit for a positive displacement drilling mud motor.

BRIEF DESCRIPTION OF THE DRAWINGS

The following Detailed Description will be better understood when read in connection with the drawings, wherein.

DETAILED DESCRIPTION

Figure 1:
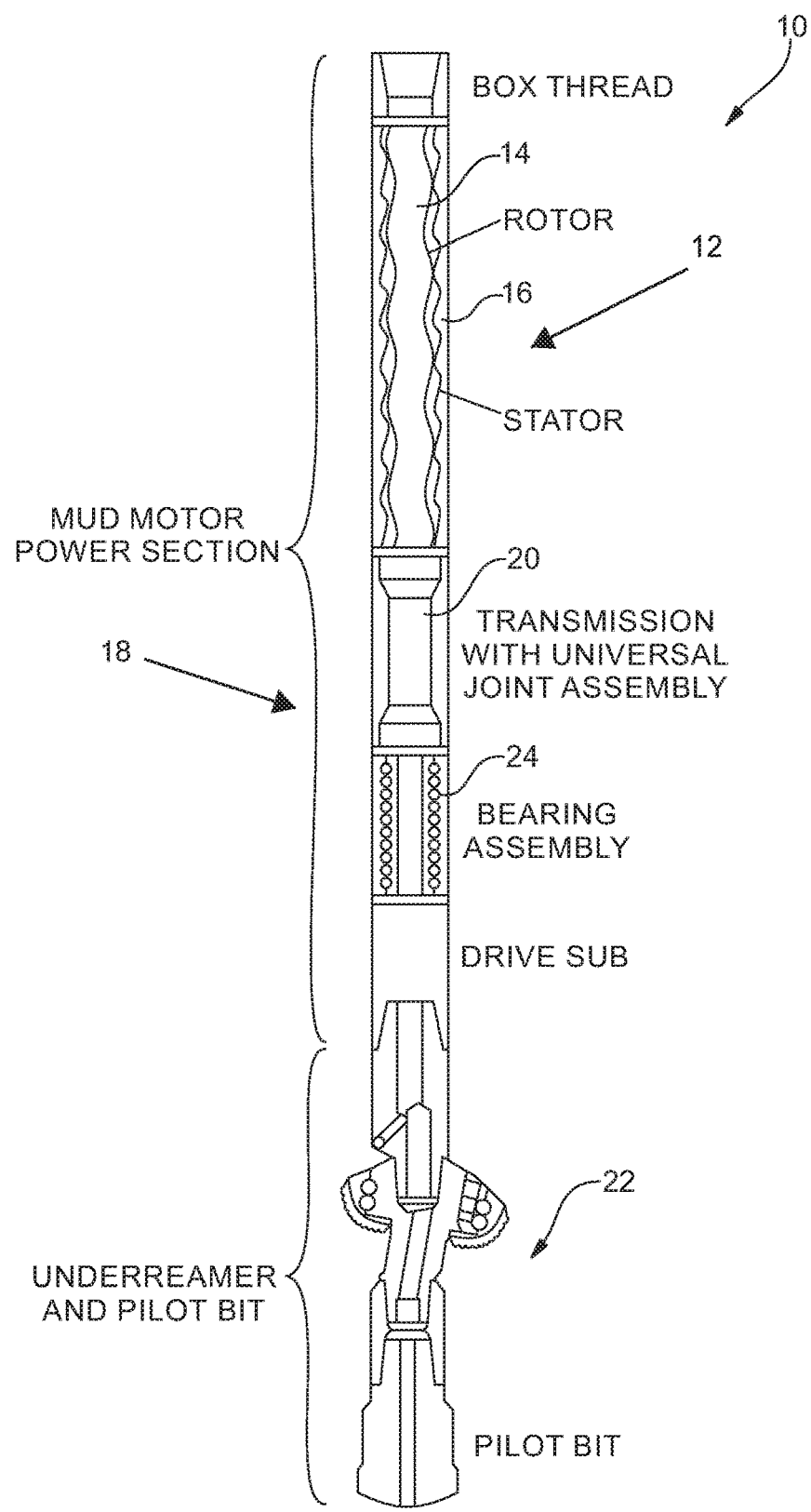
FIG. 1 is a schematic view of a mud motor and drill bit used in a subterranean drilling string (derived from Graber, K. K., Pollard, E., Jonasson, B., and Schulte, E. (Eds.), 2002. Overview of Ocean Drilling Program Engineering Tools and Hardware. *ODP Tech. Note* 31. doi:10.2973/odp.tn.31.2002)

The alloy according to the present invention contains at least about 0.15%, better yet at least 0.18%, and preferably at least about 0.21% carbon. Carbon contributes to the strength and hardness capability provided by the alloy. Carbon is also beneficial to the temper resistance of this alloy. Too much carbon adversely affects the toughness provided by the alloy. Therefore, carbon is restricted to not more than about 0.30% and better yet to not more than about 0.27%. Preferably, the alloy contains not more than about 0.24% carbon for good toughness at higher strength and hardness levels.

At least about 1.7%, better yet at least about 1.8%, and preferably at least about 1.95% manganese is present in this alloy primarily to deoxidize the alloy. It has been found that manganese also benefits the high strength and toughness provided by the alloy. If too much manganese is present, then an undesirable amount of retained austenite may result during hardening and quenching such that the high strength provided by the alloy is adversely affected. Therefore, the alloy may contain up to about 2.3% or 2.2% manganese. Preferably, the alloy contains not more than about 2.05% manganese.

Silicon benefits the hardenability and temper resistance of this alloy. Therefore, the alloy contains at least about 0.7% silicon, better still at least about 0.8%, silicon, and preferably, at least about 0.85% silicon. Too much silicon adversely affects the hardness, strength, and ductility of the alloy. In order to avoid such adverse effects silicon is restricted to not more than about 1.1%, better yet to not more than about 1.0%, and preferably to not more than about 0.95% in this alloy.

The alloy according to this invention contains at least about 1.85% chromium because chromium contributes to the good hardenability, high strength, and temper resistance provided by the alloy. Preferably, the alloy contains at least about 1.95% and better yet at least about 2.05% chromium. More than about 2.35% chromium in the alloy adversely affects the impact toughness and ductility provided by the alloy. Preferably, chromium is restricted to not more than about 2.25% and for best results, to not more than about 2.15% in this alloy.

Nickel is beneficial to the good toughness provided by the alloy according to this invention. Therefore, the alloy contains at least about 0.5% nickel and better yet, at least about 0.6% nickel. Preferably the alloy contains at least about 0.65% nickel. The benefit provided by larger amounts of nickel adversely affects the cost of the alloy without providing a significant advantage. In order to limit the upside cost of the alloy, the alloy contains not more than about 0.9%, better yet to not more than about 0.8%, and preferably to not more than about 0.75% nickel.

Molybdenum is a carbide former that is beneficial to the temper resistance provided by this alloy. The presence of molybdenum boosts the tempering temperature of the alloy such that a secondary hardening effect is achieved when the alloy is tempered at about 450° F. to 600° F. Molybdenum also contributes to the strength and impact toughness provided by the alloy. The benefits provided by molybdenum are realized when the alloy contains at least about 0.1% molybdenum, better yet, at least about 0.15%, and preferably at least about 0.18% molybdenum. Like nickel, molybdenum does not provide an increasing advantage in properties relative to the significant additional cost of larger amounts of molybdenum. For that reason, the alloy contains not more than about 0.3% molybdenum, better yet not more than about 0.25% molybdenum, preferably not more than about 0.22% molybdenum. Tungsten may be substituted for some or all of the molybdenum in this alloy. When present, tungsten is substituted for molybdenum on a 2:1 basis.

This alloy contains at least about 0.30% copper which contributes to the hardenability and impact toughness of the alloy. The alloy may contain at least about 0.4% copper and preferably contains at least about 0.45% copper. Too much copper can result in precipitation of an undesirable amount of free copper in the alloy matrix which can adversely affect the toughness of the alloy. Therefore, not more than about 0.7%, better yet, not more than about 0.6%, and preferably not more than about 0.55% copper is present in this alloy.

Vanadium contributes to the high strength and good hardenability provided by this alloy. Vanadium is also a carbide former and promotes the formation of carbides that help provide grain refinement in the alloy. The vanadium carbides also benefit the temper resistance and secondary hardening capability of the alloy. For those reasons, the alloy preferably contains at least about 0.20% vanadium. The alloy may contain at least about 0.25% vanadium and preferably contains at least about 0.30% vanadium. Too much vanadium adversely affects the strength of the alloy because of the formation of larger amounts of carbides in the alloy which depletes carbon from the alloy matrix material. Accordingly, the alloy may contain not more than about 0.5% vanadium and better yet, not more than about 0.45% vanadium. Preferably the alloy contains not more than about 0.40% vanadium. Niobium can be substituted for some or all of the vanadium in this alloy because like vanadium, niobium combines with carbon to form $M_4C_3$ carbides that benefit the temper resistance and hardenability of the alloy. When present, niobium is substituted for vanadium on 1.8:1 basis.

This alloy may also contain a residual amount of calcium, up to about 0.05%, which is retained from additions during melting of the alloy to help remove sulfur and thereby benefit the impact toughness provided by the alloy. Preferably, the alloy contains not more than about 0.02% or 0.01% calcium, and may contain as little as 0.005% calcium.

A small amount of titanium may be present at a residual level of up to about 0.05% from deoxidation additions during melting. However, the alloy preferably contains not more than about 0.025% or not more than about 0.01% titanium. Up to about 0.05% aluminum may also be present in the alloy from deoxidation additions during melting. Preferably, the alloy contains not more than about 0.025% or not more than about 0.015% aluminum.

The balance of the alloy is essentially iron and the usual impurities found in commercial grades of similar alloys and steels. In this regard, the alloy may contain up to about 0.025% phosphorus. Preferably, the alloy contains not more than about 0.01%, and better yet, not more than about 0.005% phosphorus. Up to about 0.025% sulfur may also be present in the alloy. Preferably the alloy contains not more than about 0.001%, and better yet, not more than about 0.0005% sulfur. Cobalt is also considered an impurity in this alloy. However, the alloy may contain up to about 0.25% cobalt. Preferably the alloy contains not more than about 0.05% or not more than about 0.02 or 0.01% cobalt.

The alloy according to the present invention is balanced to provide high yield strength and impact toughness in the hardened and tempered condition. In this regard, the preferred composition is balanced to provide a yield strength of at least about 180 ksi in combination with good toughness as indicated by a Charpy V-notch impact energy of at least about 25 ft-lbs and up to about 60 ft-lbs and higher at room temperature.

Primary melting and casting of the alloy are preferably accomplished with vacuum induction melting (VIM). When desired, as for critical applications, the alloy can be refined using vacuum arc remelting (VAR). Primary melting may also be performed by arc melting in air (ARC) or in a basic oxygen furnace (BOF), if desired. After melting, the alloy may be refined by electroslag remelting (ESR) or VAR. In addition, the alloy can be produced by using powder metallurgy techniques.

The alloy of this invention is preferably hot worked from a temperature of up to about 2100° F. and preferably at about 1800° F. to form an intermediate product form, in particular, elongated forms such as billets and bars. The alloy can be heat treated by austenitizing at about 1585° F. to about 1735° F., preferably at about 1635-1660° F., for about 1-2 hours. The alloy is then air cooled or oil quenched from the austenitizing temperature. When desired, the alloy can be vacuum heat treated and gas quenched. The alloy is preferably tempered at about 450-550° F. for about 2-3 hours and then air cooled. The alloy may be tempered at up to 600° F. when lower strength can be accepted.

The alloy of the present invention is useful in a wide range of applications principally transmission drive shafts and constant velocity joints used in mud motors for subterranean drilling strings. An embodiment of a mud motor device 10 is shown in FIG. 1. The mud motor device 10 includes a PCPD pump section 12. The PCPD pump section includes a rotor 14 disposed for rotation inside a stator 16 in the known manner. A power transmission section 18 is connected to the drill bit side of the PCPD pump rotor. The power transmission section includes a drive shaft 20 that is connected at one end to the PCPD pump and at the other end to the drill bit 22. A bearing assembly 24 may be interposed around the drive shaft 20. The drive shaft 20 is connected to the PCPD pump rotor 14 and to the drill bit 22 with constant velocity joints in the known manner. The drive shaft 20 and the constant velocity joints are subject to significant stresses when the drill bit encounters very hard deposits in the drilling terrain. In order to withstand such stresses and resist deformation, the drive shaft and the constant velocity are manufactured from the steel alloy described above.

The mud motor drive shaft according to the present invention is formed from an intermediate product form of the alloy, preferably round bar or rod. The intermediate form is machined to the desired diameter size and then straightened if necessary. The machined forms are then cut to the appropriate length for the drive shaft of the transmission section of a mud motor. The shafts are then hardened and tempered as described above.

It is contemplated that the alloy of this invention may also be useful for other drilling components including flex shafts, drilling jar mandrels, shock tools, and other downhole tools that require a combination of high yield strength and good impact toughness.

WORKING EXAMPLES

In order to demonstrate the combination of properties provided by the alloy of this invention two 35-lb. VIM heats were melted and cast. The heats were forged into 0.625-in. sq. bars and then processed into standard longitudinal tensile, standard long-transverse (L-T) CVN impact, standard longitudinal fatigue specimens, and standard cubes for Rockwell hardness testing. Table I contains the VIM final chemical analyses in weight percent for the two experimental heats.

TABLE I

| Heat No. | C | Mn | Si | P | S | Cr | Ni | Mo | Cu | V | Ti | Al | Fe |
|---|---|---|---|---|---|---|---|---|---|---|---|---|---|
| 2647 | 0.22 | 2.03 | 0.89 | <0.005 | <0.001 | 2.10 | 0.68 | 0.21 | 0.50 | 0.35 | <0.001 | 0.01 | Bal. |
| 2648 | 0.22 | 2.04 | 0.87 | <0.005 | <0.001 | 2.10 | 0.68 | 0.21 | 0.50 | 0.35 | <0.001 | 0.01 | Bal. |

A heat treating study was performed on test samples taken from Heat No. 2647. Duplicate tensile and duplicate CVN IE specimens were prepared from the alloy ingot and given the nine heat treatments (H.T.) shown in Table II below. The test samples were austenitized in a fluidized bed furnace for 1.5 hours at the indicated temperatures. The test specimens were then quenched in oil from the austenitizing temperature to room temperature, tempered for 2 hours at the indicated temperatures, and then air cooled from the tempering temperature to room temperature. The results shown in Table II include the 0.2% offset yield strength (Y.S.) and the ultimate tensile strength (U.T.S.) in ksi, the percent elongation (% El.), the percent reduction is area (% R.A.), the Charpy V-notch impact energy (CVN) in foot-pounds, and the average Rockwell C-Scale hardness (HRC) for each sample tested. The average tensile and CVN properties for each heat treatment are also reported. CVN IE testing was performed in accordance with ASTM Standard Test Procedure E23-12C.

TABLE II

| H.T. | Austenitizing Temperature | Tempering Temperature | Sample No. | Y.S. | U.T.S. | % El. | % R.A. | CVN | HRC |
|---|---|---|---|---|---|---|---|---|---|
| A | 1635° F. | 450° F. | 1 | 176.3 | 219.6 | 16.0 | 62.3 | 66.4 | |
| | | | 2 | 184.3 | 222.5 | 16.4 | 60.4 | 72.8 | |
| | | | Avg. | 180.3 | 221.1 | 16.2 | 61.3 | 69.6 | 45.5 |
| B | 1635° F. | 500° F. | 1 | 188.6 | 223.0 | 13.7 | 58.8 | 65.8 | |
| | | | 2 | 184.8 | 223.0 | 14.6 | 59.3 | 74.6 | |
| | | | Avg. | 186.7 | 223.0 | 14.1 | 59.0 | 70.2 | 45.0 |
| C | 1635° F. | 550° F. | 1 | 188.8 | 223.2 | 15.0 | 60.8 | 67.6 | |
| | | | 2 | 188.8 | 223.2 | 15.0 | 60.8 | 71.1 | |
| | | | Avg. | 188.8 | 223.2 | 15.0 | 60.8 | 69.4 | 44.7 |
| D | 1660° F. | 450° F. | 1 | 184.6 | 226.3 | 15.2 | 60.8 | 70.3 | |
| | | | 2 | 180.6 | 222.9 | 15.3 | 60.3 | 71.1 | |
| | | | Avg. | 182.6 | 224.6 | 15.2 | 60.6 | 70.7 | 45.5 |

TABLE II-continued

| H.T. | Austenitizing Temperature | Tempering Temperature | Sample No. | Y.S. | U.T.S. | % El. | % R.A. | CVN | HRC |
|---|---|---|---|---|---|---|---|---|---|
| E | 1660° F. | 500° F. | 1 | 185.4 | 223.8 | 15.2 | 60.2 | 70.3 | |
| | | | 2 | 185.1 | 223.4 | 14.3 | 57.7 | 71.5 | |
| | | | Avg. | 185.2 | 223.6 | 14.7 | 58.9 | 70.9 | 45.6 |
| F | 1660° F. | 550° F. | 1 | 181.0 | 223.4 | 14.6 | 59.7 | 64.7 | |
| | | | 2 | 184.8 | 223.0 | 14.3 | 56.7 | 64.7 | |
| | | | Avg. | 182.9 | 223.2 | 14.4 | 58.2 | 64.7 | 45.7 |
| G | 1685° F. | 450° F. | 1 | 177.9 | 223.2 | 13.7 | 58.7 | 73.7 | |
| | | | 2 | 174.1 | 222.3 | 14.8 | 60.7 | 73.9 | |
| | | | Avg. | 176.0 | 222.7 | 14.2 | 59.7 | 73.8 | 45.7 |
| H | 1685° F. | 500° F. | 1 | 180.6 | 222.9 | 13.3 | 58.3 | 72.5 | |
| | | | 2 | 177.0 | 223.1 | 14.3 | 61.3 | 73.6 | |
| | | | Avg. | 178.8 | 223.0 | 13.8 | 59.8 | 73.1 | 43.4 |
| I | 1685° F. | 550° F. | 1 | 180.9 | 223.2 | 14.3 | 61.8 | 68.0 | |
| | | | 2 | 180.6 | 222.9 | 13.6 | 57.8 | 71.9 | |
| | | | Avg. | 180.7 | 223.0 | 14.0 | 59.8 | 70.0 | 45.2 |

An important consideration for any high strength steel is whether it exhibits a Ductile-to-Brittle Transition Temperature (DBTT). Since oil and gas drilling can be performed in geographical areas that vary widely in temperature, the DBTT of the alloy for the mud motor transmission shaft is particularly of that application. Therefore, additional CVN samples from Heats 2647 and 2648 were tested to evaluate the CVN impact energy at temperatures ranging from −40° F. to +150° F. The results are shown in Table III below including the heat number for each test sample, the test temperature in ° F. (Temp.), and the CVN IE in ft-lbs (CVN). The results are graphed in FIG. 2.

TABLE III

| Heat No. | Temp. | CVN |
|---|---|---|
| 2648 | 150 | 68.4 |
| 2647 | 68 | 67.6 |
| 2647 | 68 | 71.1 |
| 2648 | 68 | 63.4 |
| 2648 | 68 | 66.5 |
| 2648 | 0 | 57.8 |
| 2648 | 0 | 59.2 |
| 2648 | −20 | 47.9 |
| 2647 | −20 | 53.9 |
| 2647 | −40 | 52.6 |
| 2647 | −40 | 53.0 |

Figure 2:
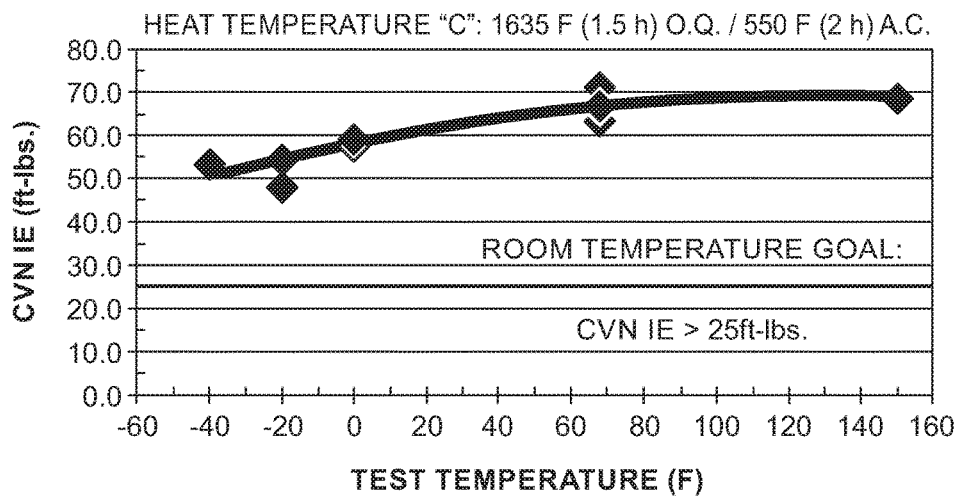
FIG. 2 is a graph of Charpy V-notch impact energy as a function of test temperature for the data presented in Table IV.

The data presented in Table III and FIG. 2 show that the alloy of this invention has essentially no ductile-to-brittle transition temperature over the tested temperature range. This means that the good toughness provided by the alloy of this invention is provided over a wide range of temperatures.

Figure 3:
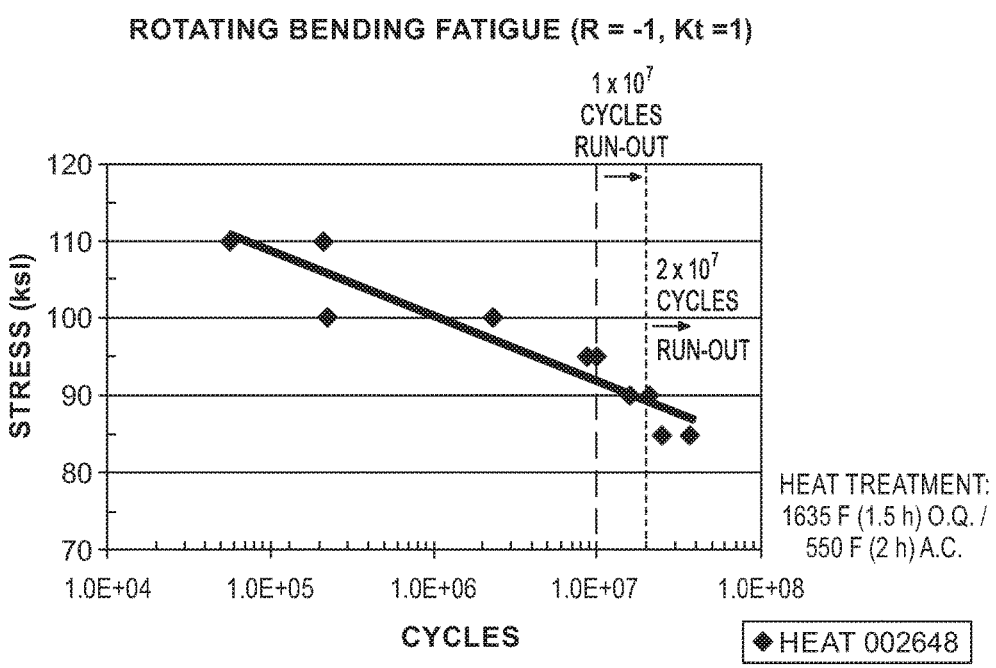
FIG. 3 is a S-N graph of applied stress as a function of the number of cycles to fracture for the R. R. Moore rotating bending fatigue data presented in Table V.

In order to demonstrate the fatigue life provided by the alloy according to the present invention, R.R. Moore Rotating Bending testing was performed on the fatigue specimens. Before testing, the fatigue specimens were hardened and tempered using Heat Treatment C described above. The results of the rotating bending fatigue testing are reported in Table IV below including the applied stress (Stress) in ksi and the number of cycles (Cycles) until the specimen fractured. The data are graphed in FIG. 3.

TABLE IV

| Stress | Cycles |
|---|---|
| 110 | 57,000 |
| 110 | 213,000 |
| 100 | 224,000 |
| 100 | 2,337,000 |
| 90 | 20,805,000 |
| 90 | 15,801,000 |

The terms and expressions which are employed in this specification are used as terms of description and not of limitation. There is no intention in the use of such terms and expressions of excluding any equivalents of the features shown and described or portions thereof. It is recognized that various modifications are possible within the invention described and claimed herein.

The invention claimed is:

1. A hardened and tempered steel article formed from a steel alloy consisting essentially of, in weight percent, about C about 0.15 to about 0.30
Mn about 1.7 to about 2.3
Si about 0.7 to about 1.1
Cr about 1.85 to about 2.35
Ni about 0.5 to about 0.9
Mo+½W about 0.1 to about 0.3
Cu about 0.3 to about 0.7
V+⅝×Nb about 0.2 to about 0.5 and the balance is iron, usual impurities, and residual amounts of other elements added during melting for deoxidizing and/or desulfurizing the alloy, said article providing a yield strength of at least about 180 ksi and a Charpy V-notch impact energy of at least about 25 ft-lbs wherein the article comprises a shaft or a constant velocity joint for a transmission drive unit of a drilling mud motor.

2. The steel article claimed in claim 1 wherein the alloy contains at least about 0.18% carbon.

3. The steel article claimed in claim 2 wherein the alloy contains not more than about 0.27% carbon.

4. The steel article claimed in claim 1 wherein the alloy contains at least about 1.8% manganese.

5. The steel article claimed in claim 4 wherein the alloy contains not more than about 2.2% manganese.

6. The steel article claimed in claim 1 wherein the alloy contains at least about 0.8% silicon.

7. The steel article claimed in claim 6 wherein the alloy contains not more than about 1.0% silicon.

8. The steel article claimed in claim 1 wherein the alloy contains at least about 1.95% chromium.

9. The steel article claimed in claim 8 wherein the alloy contains not more than about 2.25% chromium.

10. The steel article claimed in claim 1 wherein the alloy contains at least about 0.6% nickel.

11. The steel article claimed in claim 10 wherein the alloy contains not more than about 0.8% nickel.

12. The steel article claimed in claim 1 wherein the alloy contains at least about 0.15% (Mo+½W).

13. The steel article claimed in claim 12 wherein the alloy contains not more than about 0.25% (Mo+½W).

14. The steel article claimed in claim 1 wherein the alloy contains at least about 0.4% copper.

15. The steel article claimed claim 14 wherein the alloy contains not more than about 0.6% copper.

16. The steel article claimed in claim 1 wherein the alloy contains at least about 0.25% (V+⅝Nb).

17. The steel article claimed in claim 16 wherein the alloy contains not more than about 0.45% (V+⅝Nb).

18. The steel article claimed in claim 1 wherein the alloy consists essentially of C about 0.21 to about 0.24
Mn about 1.95 to about 2.05
Si about 0.85 to about 0.95
Cr about 2.05 to about 2.15
Ni about 0.65 to about 0.75
Mo+½W about 0.18 to about 0.22
Cu about 0.45 to about 0.55
V+⅝×Nb about 0.30 to about 0.40 and the balance is iron, usual impurities, and residual amounts of other elements added during melting for deoxidizing and/or desulfurizing the alloy.

* * * * *